US 6,553,190 B1

(12) United States Patent
Rodriguez

(10) Patent No.: US 6,553,190 B1
(45) Date of Patent: Apr. 22, 2003

(54) CORRECTION OF PULSE WIDTH ACCUMULATOR BASED ON THE TEMPERATURE AND RELATIVE HUMIDITY

(75) Inventor: Santiago Rodriguez, Boise, ID (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 0 days.

(21) Appl. No.: 09/977,688

(22) Filed: Oct. 16, 2001

(51) Int. Cl.⁷ ................................................ G03G 15/08
(52) U.S. Cl. ............................................ 399/27; 399/25
(58) Field of Search ............................. 399/24, 25, 27, 399/29, 8, 9, 111; 358/1.1, 1.13, 1.15, 1.16, 1.17, 1.18, 1.2, 1.9; 347/252, 251, 240; 702/179

(56) References Cited

U.S. PATENT DOCUMENTS

| 5,793,406 | A | * | 8/1998 | Trask et al. .................. 347/252 |
| 5,987,398 | A | * | 11/1999 | Halverson et al. .......... 702/179 |
| 6,052,203 | A | * | 4/2000 | Suzuki et al. ................. 358/1.9 |
| 6,173,134 | B1 | * | 1/2001 | Nishimura et al. ........... 399/58 |

\* cited by examiner

Primary Examiner—Hoan Tran

(57) ABSTRACT

An amount of toner remaining within a toner cartridge is determined by sensing an environmental factor, determining a pulse width count, and determining a corrected pulse width count based on the pulse width count and the environmental factor. In addition, the amount of toner remaining within the toner cartridge is calculated based on the corrected pulse width count and a predetermined starting amount of toner in the toner cartridge.

23 Claims, 3 Drawing Sheets

CORRECTION OF PULSE WIDTH ACCUMULATOR BASED ON THE TEMPERATURE AND RELATIVE HUMIDITY

FIELD OF THE INVENTION

This invention relates generally to printing, and more particularly to estimation of toner usage.

BACKGROUND OF THE INVENTION

It is generally known that electrophotographic printers utilize toner to generate text and/or images on a print medium, such as, paper. In this regard, a toner cartridge is typically employed to store the toner. In the event the toner cartridge runs out of toner in the middle of a print job, paper and time may be wasted and users may become frustrated. Thus, to insure sufficient quantities of toner for a print job, sensors are often utilized to measure the toner level. However, sensors are expensive. In this regard, methods of toner estimation may be employed.

Previous inventions have disclosed methods of estimating toner usage for a print job. Typically, the toner usage is estimated for each print job. If the estimate indicates that insufficient toner is remaining in the cartridge, a user may be notified. For example, U.S. Pat. No. 5,802,420 discloses a method of predicting toner usage based upon printing history. For example, if a certain amount of toner was used to print the last 10 pages, the next 10 pages is estimated to use that same amount. U.S. Pat. No. 5,937,255 discloses a method of estimating toner usage based upon a pixel count. For example, if "T" amount of toner is used to generate one pixel, then 100 pixels is estimated to use 100×T amount of toner.

However, different pixels may not utilize the same amount of toner. For example, in the assignee's HP Monochrome and Color LaserJet™, a laser light source is modulated as it scans across the surface of an optical photoreceptor ("OPR"). To create a pixel, the laser light source may be modulated (or pulsed) to illuminate a desired pixel location. However, the pixel does not represent a fixed quantity of toner. For each pulse, the length of time (or duration) the laser is on as it scans across the OPR correlates to the width of the pulse on the OPR surface. The width and number of pulses used to create a pixel may vary from one pixel to another pixel. For example, to produce certain fine details, it may be advantageous to produce relatively narrow pixels. Thus, the duration of the pulse used to create the relatively narrow pixel may be correspondingly short. Conversely, relatively wider pulses may be used to produce a substantially solid line across the page.

Moreover, even for a given sized pixel, the amount of toner used may vary from pixel to pixel. For example, the number of pulses used to create a pixel may differ from pixel to another. A first pixel may be produced with a single pulse. A second pixel may be produced with more than one pulses. However, the first and second pixel may be substantially the same size despite using varying amount of toner based on the number of pulses.

SUMMARY OF THE INVENTION

The invention includes a method, a computer readable medium and an apparatus for correcting a pulse width count.

In one respect, the invention includes a method for correcting a pulse width count in response to an environmental factor. The method comprises determining the pulse width count and calculating a corrected pulse width count based on the pulse width count and the environmental factor.

In another respect, the invention includes a computer readable medium on which is embedded computer software capable of automatically correcting a pulse width count in response to an environmental factor. The software comprises determining the pulse width count and calculating a corrected pulse width count based on the pulse width count and the environmental factor.

In yet another respect, the invention includes an apparatus for correcting a pulse width count in response to an environmental factor. The apparatus comprises a processor system configured to determine the pulse width count, wherein the processor system is further configured to correct the pulse width count based on the environmental factor.

In comparison to known prior art, certain embodiments of the invention are capable of achieving certain aspects, including some or all of the following: (1) accurate estimation of toner usage; (2) less expensive; (3) capable of being decentralized and (4) more robust. Those skilled in the art will appreciate these and other aspects of various embodiments of the invention upon reading the following detailed description of a preferred embodiment with reference to the below-listed drawings.

DETAILED DESCRIPTION OF A PREFERRED EMBODIMENT

For simplicity and illustrative purposes, the principles of the invention are described by referring mainly to an exemplary embodiment thereof, particularly with references to a system to laser printer. However, one of ordinary skill in the art would readily recognize that the same principles are equally applicable to, and may be implemented in, a system capable of utilizing colorant (e.g., toner, ink, pigment, dye, et.) to produce text and/or one or more images on a print medium, and that any such variations are within the scope of the invention. Furthermore, the same principles are equally applicable to, and may be implemented in, a system capable of utilizing a material (e.g., metal, plastic, resin, wax, etc.) to produce a substantially, two dimensional image or a three dimensional object.

A printjob, as described herein, may include text, solid lines, and/or half tones. The print job is typically initiated by a user operating a personal computer ("PC") or terminal on the local area network ("LAN") in which a printer is located. However, it is within the scope of this invention that the print job may be received in any manner known to those skilled in the art. For example, the printer may be directly attached to a computer. Furthermore, it is within the scope of this invention that the printer and the print job input device (e.g., keyboard, scanner, etc.) be a single device. For example, and electronic typewriter and/or "all in one device", such as a printer/copier/fax machine.

To accurately estimate toner usage, a pulse width count ("PWC") may be accumulated. The PWC is a measure of the accumulated width of pulses. Due to the fact that pixels may not represent fixed units of toner usage, the PWC correlates to the amount of toner transferred more accurately than an accumulated count of pixels and/or dots. While pixels are often thought of as dots, for the purpose of this disclosure, a pixel may be a dot or a cluster of dots. While in a preferred form the PWC is accumulated per page, the PWC may be accumulated per pixel, per scan line, per page, per print job, per usable lifespan of the toner cartridge, etc. As will be shown below, the PWC may be adjusted to improve toner usage correlation.

It is a phenomenon of the electrophotographic process that, for a given pulse width, varying the environment in which a printer is located results in a non-linear amount of toner transfer. For example, and as illustrated by an exemplary graph in FIG. 3, toner usage per pulse width is altered as a function of relative humidity. The PWC may be adjusted based on the relative humidity to obtain a corrected PWC ("CPWC"). Estimation of toner usage utilizing CPWC correlates to actual toner usage more accurately than pixel counting alone.

Environmental factors (e.g., temperature, humidity, barometric pressure, altitude, etc.) may affect toner transfer.

Figure 1:
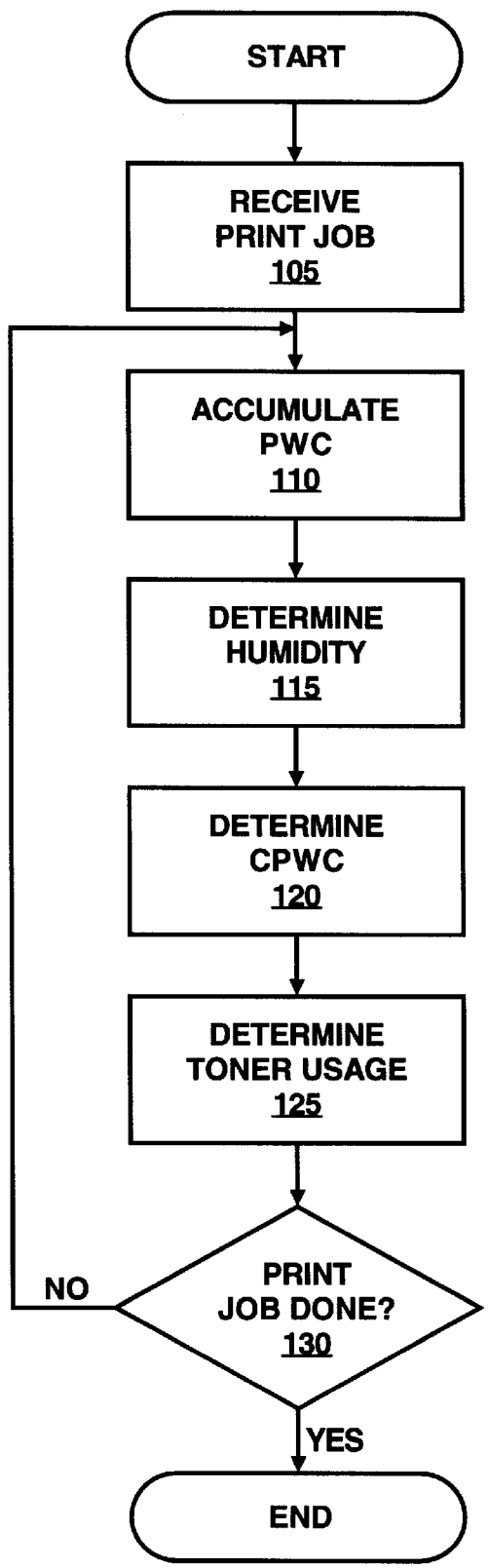
FIG. 1 is a flow chart of a method, in accordance with a manner in which an embodiment of the invention may be practiced.

FIG. 1 is a flow chart of a method 100, in accordance with a manner in which an embodiment of the invention may be practiced. As depicted in FIG. 1, the method 100 is initiated in response to receiving a print job in step 105.

In step 110, the PWC may be accumulated based on the print job or corresponding printer specific commands generated in response to the print job. The PWC may be determined at the time the print job is generated, after the print job has finished printing, and/or any time in between. In a preferred form, a PWC may be accumulated for each page of the print job. The PWC for each pixel may be determined as the pixel is being produced. The PWC for each pixel may be added to previously determined PWCs to accumulate a PWC value for each scanned line. An accumulated PWC value for each page may be determined in a variety of ways, such as by adding the values of all of the pixels or scan lines within the page. Similarly, an accumulated print job and usable lifespan of the toner cartridge PWC may be determined.

In step 115, an associated relative humidity may be determined. The associated relative humidity may be determined before the print job is generated, after the print job has finished printing, and/or any time in between. Accordingly, the steps 110 and 115 need not be performed in the order as shown in FIG. 1, but rather, the steps 110 and 115 may be performed in the opposite order, simultaneously, or any variation therein. In a preferred form, the associated relative humidity is determined while printing the print job. For example, the associated relative humidity may be measured by a sensor as each page of the print job is being produced. Although measuring relative humidity is described in this invention, it is to be understood that the invention is not limited to measuring relative humidity, but rather, the invention may be configured to modify PWC based on any environmental factor and that the environmental factor need not be measured directly but may be inferred or received from another source.

In step 120, the method 100 may determine the CPWC. The associated relative humidity may be utilized to determine the CPWC for each pixel, scan line, page, printjob and or the usable lifespan of the toner cartridge. In a preferred form, the CPWC value for each page may be determined by referencing the PWC and associated relative humidity for the page and applying these values to a look up table ("LUT"), such as, the LUT disclosed in U.S. Pat. No. 5,793,406 and is herein incorporated by reference. Additionally or instead of the LUT, a statistical regression equation ("SRE") substantially the same as the SRE used to generate the LUT may be used to determine the CPWC without departing from the scope of the invention. In general, the LUT may be thought of as a predetermined or static SRE that is less resource intensive than the SRE but less capable of adjustability. A combination of LUT and SRE may be incorporated in such a way as to utilize the LUT for common PWCs, thus saving system resources and increasing print speed. The SRE may be utilized for uncommon PWCs to increase accuracy of toner estimation. Moreover, the SRE and/or the LUT may take into account the following factors: system design, toner chemistry, OPR sensitivity, PWC, pulse edge count, associated half tone level, pixel count, temperature, relative humidity, empirical data, etc.

Additionally or instead of step 120, in step 125 the method 100 may determine toner usage. For example, the method 100 may reference the CPWC to determine the toner usage or the method 100 may reference the PWC and associated relative humidity values within an SRE or LUT that corrects the PWC based on the relative humidity and determines toner usage in a single process. After determining the toner usage, the value may be stored within memory. A toner remaining value may be determined as well. For example, based on a predetermined starting amount of toner and the toner usage, the toner remaining may be calculated. Furthermore, PWC, relative humidity, CPWC, toner remaining, and pixel count values may be stored within memory.

In step 130, it may be determined if the method 100 has reached the end of the print job or the corresponding printer specific commands generated in response to the print job. For example, if an end of file marker is encountered, the method 100 may terminate. If it is determined that the end of the print job or the corresponding printer specific commands generated in response to the print job has not been reached, the method 100 may return to step 110.

Figure 2:
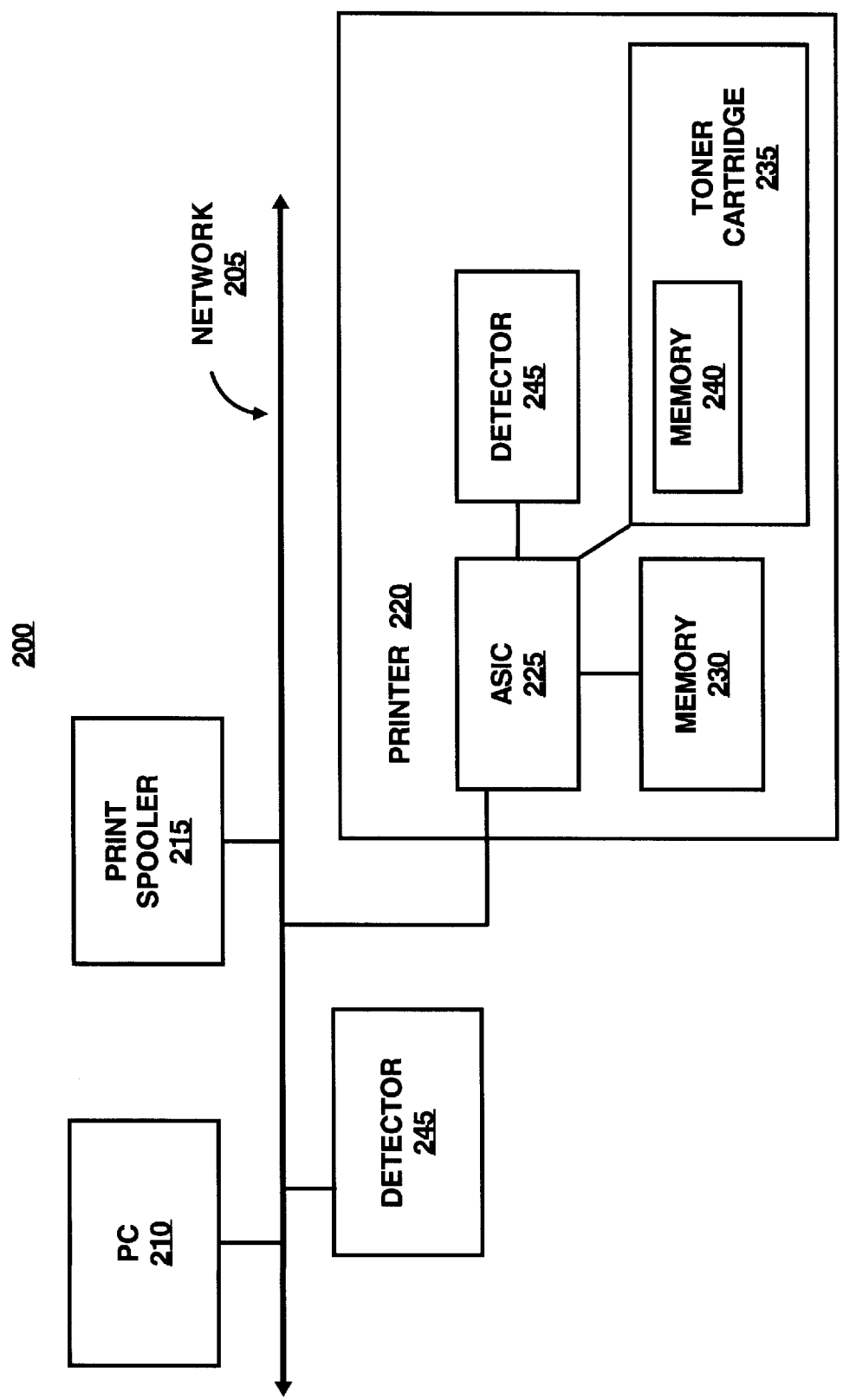
FIG. 2 is a block diagram of a system, in accordance with an embodiment of the invention described in FIG. 1.

FIG. 2 is a block diagram of a system 200, in accordance with an embodiment of the invention described in FIG. 1. Accordingly, the following description of FIG. 2 will be made with particular reference to FIG. 1. As shown in FIG. 2, the system 200 includes a network 205. The system 200 further includes a PC 210, a print spooler 215 and a printer 220 configured to communicate via the network 205. Additionally, the system 200 may include other components configured to communicate via the network 205, such as, routers, servers, other PCs, other printers, etc. Furthermore, the system 200 may include a detector 245 capable of measuring or inferring environmental factors, such as temperature, humidity, etc. Moreover, the system 200 may be configured to communicate with the Internet via the network 205.

The PC 210 may be configured to provide the capability to generate a print job as described in step 105 of FIG. 1. The print job may be forwarded to the print spooler 215 across the network 205. In another form, the PC 210 may be directly connected to the printer 220. Although not shown in FIG. 2, the printer 220 and the PC 210 may be a single device. For example, an electronic typewriter. Furthermore, it is within the scope of the invention that the printer 220 may be an "all in one device", such as a printer/copier/fax machine. Additionally, the PC 210 may be configured to receive information from components of the network 205.

The print spooler 215 may be configured to accept the print job via the network 205. The print spooler 215 may further be configured to forward the print job to the printer 220 and/or store the print job until the printer 220 is ready to accept it. Typically, the print job is forwarded as a stream of bits corresponding to how each page of the print job appears and, in a process described in more detail below, the printer 220 computes printer specific commands (e.g., laser pulse modulation). However, it is within the purview of the invention that the printer specific commands may be generated by the PC 210, the print spooler 215, the printer 220, and/or various other components configured to communicate via the network 205. Additionally, the CPWC, the pixel count, toner remaining, and the toner usage values may be generated by the PC 210, the print spooler 215, the printer 220, and/or various other components configured to communicate via the network 205.

According to a preferred embodiment illustrated in FIG. 2, the printer 220 is a laser printer. In other words, the printer 220 utilizes a modulated laser to alter the electrostatic charge on an OPR in an electrophotographic process known to those skilled in the art. According to the principles of the invention, a number of different types of laser printers may be utilized for proper operation of the invention. Additionally, the term "laser printer" is not intended to be a limitation, but rather, with respect to the disclosure, describes a printer in which toner or ink is applied to the surface of a material in the form of pixels. Thus, it is within the purview of this invention that any known printer capable of suitably varying the width and/or half tone level of pixels may be substituted for the printer without departing from the scope of this invention.

The printer 220 includes an application specific integrated circuit ("ASIC") 225. The ASIC 225 may be configured to receive the print job. The ASIC 225 may further be configured to store the print job to a memory 230. The ASIC 225 may further be configured to convert the print job into printer specific commands. A memory 230 within the printer 220 and connected to the ASIC 225 may be configured to store data for the ASIC 225. The data may include the print job, printer specific commands, PWC, half tone level, pulse edge count, CPWC, pixel count, relative humidity, toner usage, toner remaining, etc.

The detector 245 may be a component of the printer 220. Additionally or alternatively, the detector 245 may be located in the general vicinity of the printer 220 such that the environmental factors affecting the detector 245 are substantially the same as for the printer 220. The detector 245 may be configured to communicate with the ASIC 225 directly or via the network 205. Moreover, any known type or form of device capable of detecting or inferring environmental factors and conveying this information in a computer readable is within the scope of the invention.

The printer 220 may include a toner cartridge 235. The toner cartridge 235 being filled with a predetermined amount of toner and configured to dispense a measured amount of toner as required. The toner cartridge 235 may include a memory 240. The memory 240 may be non-volatile, for example, electronically erasable programmable read only memory ("EEPROM"). The memory 240 may be configured to store data related to toner usage and/or toner remaining. The toner cartridge 235 may be configured for communication with the ASIC 225.

Figure 3:
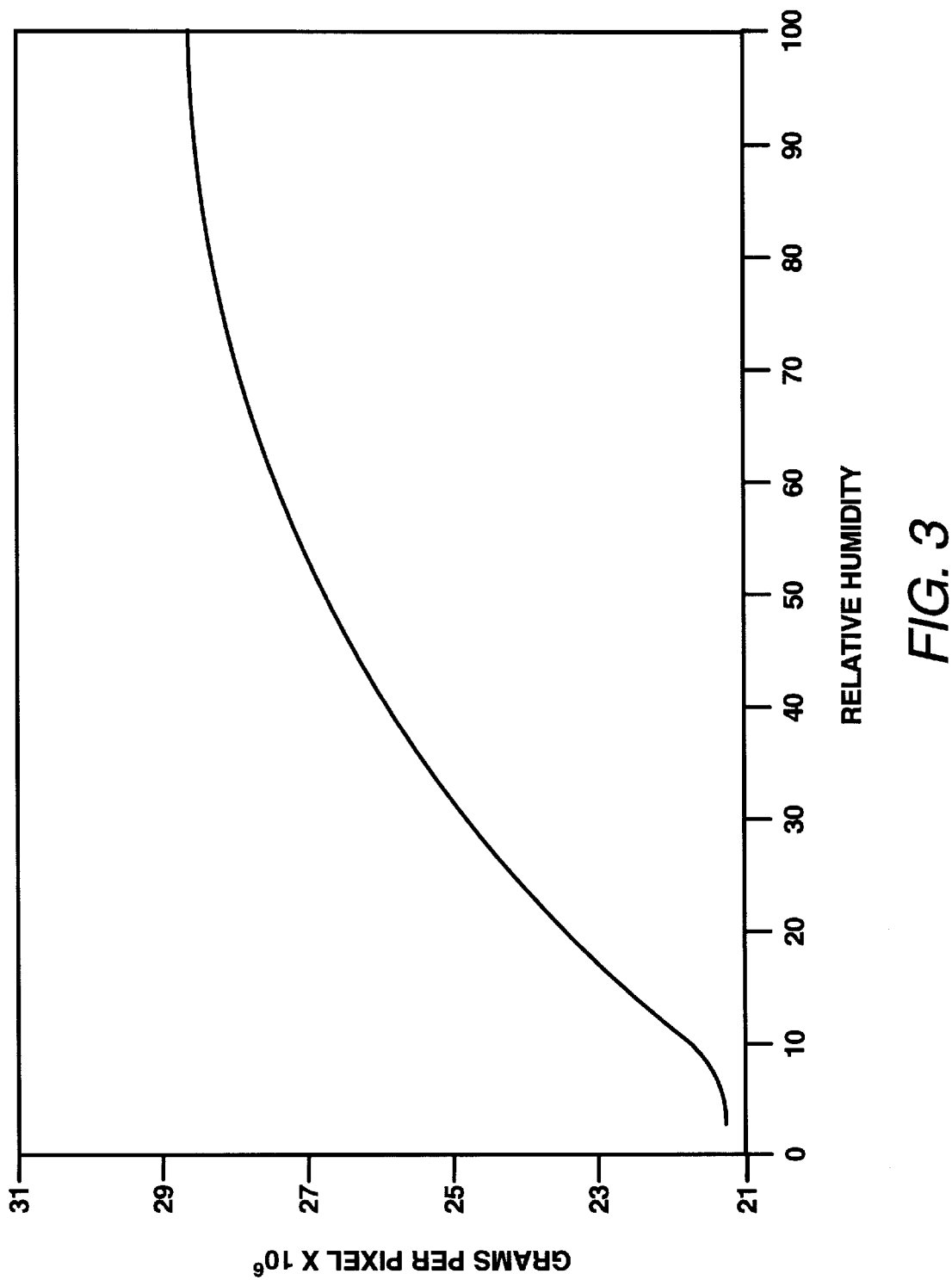
FIG. 3 is an exemplary graph, in accordance with an embodiment of the invention described in FIG. 1, of relative humidity (abscissa) as it effects the weight, in grams, of $10^6$ pixels (ordinate).

FIG. 3 is an exemplary graph, in accordance with an embodiment of the invention described in FIG. 1, of relative humidity (abscissa) as it effects the weight, in grams, of $10^6$ pixels (ordinate). As shown in FIG. 3, the non-linear effect of relative humidity on toner transfer may be plotted in terms of weight of toner transferred to the printing media. In general, toner transfer is shown to increase as relative humidity increases. Thus, in terms of toner usage per pulse width, a correction factor based on a function of the curve may be used to adjust the PWC.

Additionally, it is to be understood that the invention is not limited to a function of the graph illustrated in FIG. 3, but rather, the invention may include any reasonable function correlating toner usage to relative humidity. Accordingly, the graph depicted in FIG. 3 is for illustrative purposes only and thus is not meant to limit the present invention in any respect.

Moreover, the correction factor is determined based upon system design, empirically determined data, etc. In general, the correction factor may depend upon one or more of the following factors: system application, laser specifications, printer head specifications, toner or ink characteristics, OPR parameters, accuracy of the system, environmental factors, etc.

The method 100 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for determining an amount of toner remaining within a toner cartridge, said method comprising:
    sensing an environmental factor;
    determining a pulse width count;
    determining a corrected pulse width count based on said pulse width count and said environmental factor; and
    calculating said amount of toner remaining within said toner cartridge based on said corrected pulse width count and a predetermined starting amount of toner in said toner cartridge.

2. The method of claim 1, further comprising:
    calculating said corrected pulse width count utilizing a statistical regression equation.

3. The method of claim 1, further comprising:
    determining said corrected pulse width count utilizing a lookup table.

4. The method of claim 3, wherein said lookup table is based on a statistical regression equation.

5. The method of claim 1, wherein said environmental factor comprises at least one of temperature and relative humidity.

6. The method of claim 1, wherein said step of determining said pulse width count comprises:
accumulating a count of pulse widths based upon printer specific commands generated in response to a print job.

7. A computer readable medium on which is embedded computer software for performing a method of determining an amount of toner remaining within a toner cartridge, said method comprising:
sensing an environmental factor;
determining a pulse width count;
determining a corrected pulse width count based on said pulse width count and said environmental factor; and
calculating said amount of toner remaining within said toner cartridge based on said corrected pulse width count and a predetermined starting amount of toner in said toner cartridge.

8. The method of claim 7, further comprising:
calculating said corrected pulse width count utilizing a statistical regression equation.

9. The method of claim 7, further comprising:
determining said corrected pulse width count utilizing a lookup table.

10. The method of claim 9, wherein said lookup table is based on a statistical regression equation.

11. The method of claim 7, wherein said environmental factor comprises at least one of temperature and relative humidity.

12. The method of claim 7, wherein said step of determining said pulse width count comprises:
accumulating a count of pulse widths based upon printer specific commands generated in response to a print job.

13. An apparatus for determining an amount of toner remaining within a toner cartridge, said apparatus comprising:
a processor system configured to receive a sensed environmental factor, determine a pulse width count, and determine a corrected pulse width count based on said pulse width count and said environmental factor, wherein said processor system is further configured to calculate said amount of toner remaining within said toner cartridge based on said corrected pulse width count and a predetermined starting amount of toner in said toner cartridge.

14. The apparatus of claim 13, wherein said processor system comprises at least one processor associated with one or more of a PC, a print spooler, a printer and a network component.

15. The apparatus of claim 14, wherein said processor system is an application specific integrated circuit contained within a printer.

16. The apparatus of claim 13, wherein said apparatus further comprises a sensor, said sensor being configured to measure said environmental factor and relay said measurement to said processor system.

17. The apparatus of claim 13, wherein said environmental factor is one or more of temperature, relative humidity and barometric pressure.

18. The apparatus of claim 13, wherein said pulse width count is corrected for one or more of a pixel, a scan line, a page, a print job, and a usable lifespan of a toner cartridge.

19. An apparatus for determining an amount of toner remaining within a toner cartridge, said apparatus comprising:
means for sensing an environmental factor;
means for determining a pulse width count;
means for determining a corrected pulse width count based on said pulse width count and said environmental factor; and
means for calculating said amount of toner remaining within said toner cartridge based on said corrected pulse width count and a predetermined starting amount of toner in said toner cartridge.

20. The apparatus of claim 19, further comprising:
means for calculating said corrected pulse width count utilizing a statistical regression equation.

21. The apparatus of claim 19, further comprising:
means for determining said corrected pulse width count utilizing a lookup table.

22. The apparatus of claim 19, wherein said means for sensing an environmental factor further comprises means for sensing at least one of temperature and relative humidity.

23. The apparatus of claim 19, wherein said means for determining said pulse width count comprises:
means for accumulating a count of pulse widths based upon printer specific commands generated in response to a print job.

* * * * *